United States Patent
Wu et al.

(10) Patent No.: US 10,982,084 B1
(45) Date of Patent: *Apr. 20, 2021

(54) ETHYLENE VINYL ALCOHOL COPOLYMER RESIN COMPOSITION AS WELL AS FILMS AND MULTI-LAYER STRUCTURES THEREOF

(71) Applicant: CHANG CHUN PETROCHEMICAL CO., LTD., Taipei (TW)

(72) Inventors: Hou Hsi Wu, Taipei (TW); Shih Yuan Su, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,555

(22) Filed: May 19, 2020

Related U.S. Application Data

(63) Continuation-in-part of application No. 16/729,984, filed on Dec. 30, 2019, now Pat. No. 10,711,124.

(51) Int. Cl.
| | |
|---|---|
| C08L 23/08 | (2006.01) |
| C08L 29/04 | (2006.01) |
| C08L 27/12 | (2006.01) |
| C08J 3/12 | (2006.01) |
| C08J 5/18 | (2006.01) |
| C09J 7/29 | (2018.01) |
| B32B 27/30 | (2006.01) |
| B32B 7/12 | (2006.01) |
| B32B 27/08 | (2006.01) |
| B32B 27/34 | (2006.01) |
| B32B 27/32 | (2006.01) |

(52) U.S. Cl.
CPC ............... *C08L 29/04* (2013.01); *B32B 7/12* (2013.01); *B32B 27/08* (2013.01); *B32B 27/306* (2013.01); *B32B 27/32* (2013.01); *B32B 27/34* (2013.01); *C08J 5/18* (2013.01); *C09J 7/29* (2018.01); *B32B 2270/00* (2013.01); *B32B 2307/72* (2013.01); *C08J 2329/04* (2013.01); *C08J 2427/16* (2013.01); *C08J 2427/20* (2013.01); *C08L 2203/16* (2013.01)

(58) Field of Classification Search
CPC .......... C08L 23/08; C08L 27/12; C08L 29/04; C08L 2203/16; C08L 2205/14; C08J 3/12
See application file for complete search history.

(56) References Cited

U.S. PATENT DOCUMENTS

| | | | |
|---|---|---|---|
| 5,460,760 A | 10/1995 | Tsai et al. | |
| 10,711,124 B1* | 7/2020 | Wu | ................ C08L 29/04 |
| 2003/0096101 A1 | 5/2003 | Kazeto | |
| 2006/0121270 A1 | 6/2006 | Kazeto | |
| 2008/0021381 A1* | 1/2008 | Lurvey | ................ G01N 21/78 |
| | | | 604/85 |
| 2008/0199645 A1 | 8/2008 | Julien | |
| 2009/0020914 A1 | 1/2009 | Nelson et al. | |
| 2009/0098395 A1 | 4/2009 | Lu | |
| 2009/0274917 A1 | 11/2009 | Kazeto | |
| 2015/0140247 A1 | 5/2015 | Shibutani et al. | |
| 2019/0345309 A1 | 11/2019 | Okamoto et al. | |
| 2020/0143098 A1 | 5/2020 | Corliss et al. | |

FOREIGN PATENT DOCUMENTS

| | | |
|---|---|---|
| CN | 104513444 A | 4/2015 |
| CN | 102574382 B | 9/2015 |
| CN | 108779258 A | 11/2018 |
| JP | H0995583 A | 4/1997 |
| JP | 2000001593 A | 1/2000 |
| JP | 2001081262 A | 3/2001 |
| JP | 2005239902 A | 9/2005 |
| JP | 2006097033 A | 4/2006 |
| JP | 2006282835 A | 10/2006 |
| JP | 2006328195 A | 12/2006 |
| JP | 2008308657 A | 12/2008 |
| JP | 2011183814 A | 9/2011 |
| JP | 4832783 B2 | 12/2011 |
| JP | 2016084158 A | 5/2016 |
| JP | 2017088666 A | 5/2017 |
| WO | WO-2010/045152 A2 | 4/2010 |
| WO | 2015021198 A1 | 2/2015 |

OTHER PUBLICATIONS

U.S. Appl. No. 16/877,570, filed May 19, 2020.

* cited by examiner

Primary Examiner — Robert D Harlan
(74) Attorney, Agent, or Firm — Polsinelli PC

(57) ABSTRACT

The instant disclosure relates to ethylene vinyl alcohol copolymer resin composition and/or pellets thereof including one or more fluorine-containing micro-particles. The ethylene vinyl alcohol copolymer resin compositions and/or pellets thereof may have a melting pressure of 1.7 to 7.0 MPa at a shear rate of 20 $s^{-1}$ and a melting point temperature of 190° C. EVOH films formed from the EVOH may have a Charpy impact strength of at least 2.3 KJ/$m^2$ according to ISO 179-1 at 23° C. and an elongation at break of at least 17.8% according to ISO 527-2 at 23° C.

14 Claims, 3 Drawing Sheets

ETHYLENE VINYL ALCOHOL COPOLYMER RESIN COMPOSITION AS WELL AS FILMS AND MULTI-LAYER STRUCTURES THEREOF

CROSS-REFERENCE TO RELATED APPLICATIONS

This application claims priority to and is a continuation in part of U.S. patent application Ser. No. 16/729,984, filed on Dec. 30, 2019, entitled "ETHYLENE VINYL ALCOHOL PELLETS AS WELL AS FILMS THEREOF," the entirety of which is herein incorporated by reference.

FIELD OF THE DISCLOSURE

The instant disclosure relates to ethylene vinyl alcohol copolymer ("EVOH") resin composition and pellets thereof. The ethylene vinyl alcohol copolymer resin composition have micro-particles and, in particular, fluorine-containing micro-particles. The EVOH resin composition may have a melting pressure of 1.7 to 7.0 MPa at a shear rate of 20 s$^{-1}$ and a temperature of 190° C. Films and multi-layer structures formed from the ethylene vinyl alcohol copolymer resin composition and/or pellets are also disclosed herein.

BACKGROUND OF THE DISCLOSURE

EVOH resins are widely used in laminates for preserving perishable items. For example, EVOH resins and laminates are commonly used by the food packaging industry, medical device and supplies industry, pharmaceutical industry, electronics industry, and agricultural chemicals industry. EVOH resins are often incorporated as a distinct layer within a laminate to serve as an oxygen-barrier layer.

Die build-up often occurs during extruding processes utilizing EVOH. Another common problem with extruding processes utilizing EVOH is undesirable screw sticking. These problems may reduce the visual appearance of films formed from the EVOH as well as the mechanical strength. Moreover, these issues have not be sufficiently addressed or solved with convention technology.

Thus, there is a continued need for EVOH resins that provide better film mechanical properties and enable cost effective manufacturing processes.

SUMMARY OF THE INVENTION

Aspects of the disclosure are directed to ethylene vinyl alcohol copolymer ("EVOH") resin composition having micro-particles and, in particular, fluorine-containing micro-particles. The EVOH resin composition may in the form of pellet(s), film(s), fiber(s), and/or the like. The EVOH resin composition may be used to produce films or multi-layer structures. It has been conventional wisdom to avoid combining EVOH and fluorinated polymers because of their immiscibility. For example, the immiscibility of EVOH and fluorinated polymers was expected to adversely affect the appearance and the mechanical properties of films formed therefrom.

While the combination of EVOH and fluorinated polymers (referred herein also as "fluoropolymers") has been traditionally avoided due to problems arising from immiscibility, aspects of the disclose utilize fluoropolymers that are partially miscible (and partially immiscible) to produce EVOH resin composition having improved precipitation at the die and reduced screw sticking problems. Additionally, it was discovered that the EVOH resin composition disclosed herein may provide improved flexibility and increased mechanical properties to films and multi-layer structures formed therefrom. Specifically, by utilizing EVOH resin composition having fluorine-containing micro-particles, the inventors realized that EVOH films could be obtained having improved strength (e.g., as measured by Charpy impact testing) and improved flexibility (e.g., as measured by elongation at breakage).

In additional aspects of the disclosure, provided are EVOH resin composition (or pellets thereof) having a melting pressure of 1.7 to 7.0 MPa at a shear rate of 20 s$^{-1}$ and a temperature of 190° C. For example, a typical EVOH resin composition may comprise an ethylene-vinyl alcohol copolymer, and one or more fluorine-containing micro-particles, wherein the ethylene-vinyl alcohol copolymer resin composition has a melting pressure of 1.7 to 7.0 MPa at a shear rate of 20 s$^{-1}$ and a temperature of 190° C. It was surprisingly discovered that EVOH resin composition having improved properties can be obtained under a broad range of ethylene content if the melting pressure of EVOH resin composition is within the range of 1.7 to 7.0 MPa at a shear rate of 20 s$^{-1}$ and a temperature of 190° C.

The EVOH resin composition may also include one or more fluorine-containing micro-particles comprising a fluorinated polymer. Preferably, the fluorine-containing micro-particles each have a particle size with a diameter or a length of the major axis that is not greater than 20 µm. In some cases, the fluorine-containing micro-particles each have a particle size with a diameter or a length of the major axis that is 0.5 to about 19 µm. The fluorine-containing micro-particles may comprise about 1.5 to about 48 wt. % of fluorine, based on the total weight of carbon, oxygen, and fluorine elements. It was surprisingly discovered that the micro-particles size under certain ranges can further improve the film appearance and precipitation at die.

In a non-limiting example, the EVOH resin composition has at least two melting point temperatures—in other words, at least a first melting point temperature and a second melting point temperature. The first melting point temperature may be from about 100° C. to about 140° C. or from 105° C. to 135° C. The second melting point temperature may be from about 150° C. to about 195° C. or from 158° C. to 190° C.

The EVOH resin composition may have a melting pressure of 1.7 to 6.8 MPa at a shear rate of 20 s$^{-1}$ and a temperature of 190° C. In some instances, the EVOH resin composition has a melting force of 0.4 to 2.4 kN at a shear rate of 20 s$^{-1}$ and a temperature of 190° C.

Additionally or alternatively, the ethylene-vinyl alcohol copolymer of the EVOH resin composition may have a degree of saponification of 99.5 mole % or more. The ethylene-vinyl alcohol copolymer may have an ethylene content of about 20 to about 50 mole %. For example, the ethylene content of the ethylene-vinyl alcohol copolymer may be about 25 to about 45 mole %. In some instances, the EVOH resin composition are free of polyalkyleneoxides.

Preferably, the fluorine-containing micro-particles of the EVOH resin composition may have a particle size about 0.5 to about 19 µm. For instance, the particle size of fluorine-containing micro-particles may be about 1.2 to about 16 µm.

According to at least one embodiment, the EVOH resin composition comprise:

an ethylene-vinyl alcohol copolymer comprising an ethylene content of about 20 to about 50 mole % and having a degree of saponification of 99.5 mole % or more;

at least two melting point temperatures, a first melting point temperature of about 100° C. to about 140° C. and a second melting point temperature of about 150° C. to about 195° C.; and fluorine-containing micro-particle dispersed in the EVOH resin composition, wherein the EVOH resin composition has a melting pressure of 1.7 to 7.0 MPa.

Films formed from the EVOH resin composition typically have a Charpy impact strength of at least 2.3 KJ/m$^2$ (for example, according to ISO 179-1 at 23° C.) and an elongation breakage percentage of at least 17.8% (according to ISO 527-2 at 23° C.). Preferably, the film has a Charpy impact strength of at least 2.6 KJ/m$^2$. In some cases, the film may have an elongation breakage percentage of at least 20%. It was surprising that EVOH resin composition having the fluorine-containing micro-particles described herein would provide such advantageous improvements in the strength and flexibility of films formed from such EVOH resin composition pellets.

BRIEF DESCRIPTION OF THE FIGURES

Implementation of the present technology will now be described, by way of example only, with reference to the attached figures, wherein.

Figure 1:
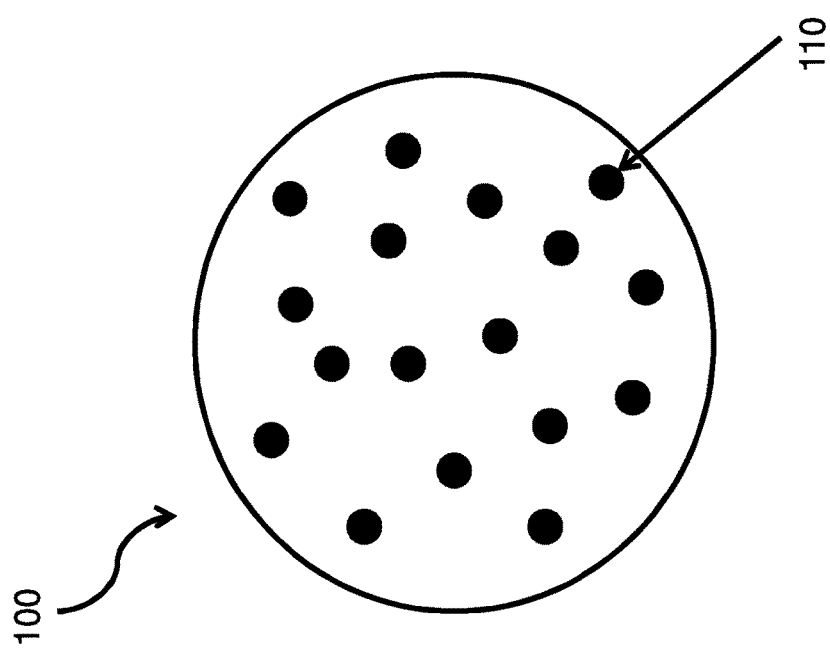
FIG. 1 is a cross-sectional depiction of an exemplary EVOH resin composition in accordance with aspects of the disclosure.

It should be understood that the various aspects are not limited to the arrangements, instrumentality, and characteristics shown in the drawings.

DETAILED DESCRIPTION OF THE DISCLOSURE

Aspects of the disclosure are directed to ethylene vinyl alcohol copolymer ("EVOH") resin composition(s). The EVOH resin composition have micro-particles, particularly fluorine-containing micro-particles, dispersed therein. The EVOH resin compositions may be used to produce films or multi-layer structures.

In accordance with one aspect of the disclosure, provided is EVOH resin composition. The EVOH resin composition can be in the form of pellet(s), film(s), fiber(s), and/or the like. As used herein, EVOH pellet(s) refer to an EVOH resin composition that has been pelletized to be in the form and/or shape of one or more pellets. Although an EVOH resin composition pelletized to be in the form of one or more EVOH pellet(s) is described throughout the instant disclosure, the EVOH resin composition may be processed to be in the form of beads, cubes, chips, shavings, or the like. The EVOH resin composition of the instant disclosure typically include an ethylene-vinyl alcohol copolymer and one or more fluorine-containing micro-particle(s) having a particle size that is not greater than 20 μm.

FIG. 1 depicts a cross-section of an exemplary EVOH resin composition 100 in accordance with aspects of the disclosure. EVOH resin composition 100 is formed from an EVOH having an ethylene content. For example, the EVOH may have an ethylene content of about 20 to about 50 mole %, about 25 to about 45 mole %, about 28 to about 42 mole %, or about 30 to about 40 mole %. EVOH resin composition 100 may be formed of two or more EVOH having different ethylene contents. For example, one of the EVOH may have an ethylene content in the range of about 20 to about 35 mole %, such as about 24 to about 35 mole %, about 28 to about 35 mole %; from about 20 to about 32 mole %, about 24 to about 32 mole %, about 28 to about 32 mole %; from about 20 to about 30 mole %, or about 24 to about 30 mole %. Additionally or alternatively, one of EVOH may have an ethylene content in the range of about 36 to about 50 mole %, such as about 40 to about 50 mole %, about 44 to about 50 mole %; from about 36 to about 45 mole %, or about 40 to about 45 mole %. In some preferred instances, however, EVOH resin composition 100 is formed from a single EVOH having an ethylene content of about 20 to about 50 mole %.

EVOH resin composition 100 has an amount of fluorine associated with the incorporation of one or more fluorinated polymer (also referred to herein as "fluoropolymer"), which can form fluorine-containing micro-particles 110 dispersed in the EVOH resin composition 100. For example, the one or more fluoropolymers may include or be chosen from polyvinylidene fluoride ("PVDF"), polytetrafluoroethylene, polyhexafluoropropylene, polychlorotrifluoroethylene, 2-chloropentafluoropropene, dichlorodifluoroethylene, 1,1-dichlorofluoroethylene, and/or combinations thereof. Additionally or alternatively, the fluoropolymer may include copolymers derived from at least one of vinylidene fluoride ("VDF"), hexafluoropropylene ("HFP"), and tetrafluoroethylene ("TFE"). In some instances, the fluoropolymer may include copolymers derived from two or more of VDF, HFP, and TFE. For example, EVOH resin composition 100 may include a copolymer derived from VDF and HFP, a copolymer derived from TFE and HFP, a copolymer derived from VDF and TFE, and/or a copolymer derived from VDF, HFP, and TFE. While not being limited to any specific theory, the inventors believe that the fluoropolymers can reduce at least one of the melting points of the EVOH resin composition 100 by producing a reduction in the crystalline size, which reduces energy requirements during processing.

The fluorine-containing micro-particles 110 may have about 1.5 to about 48 weight percent (wt. %) of fluorine, based on the total weight of carbon, oxygen, and fluorine elements of the fluorine-containing micro-particles 110. The fluorine-containing micro-particles 110 may in further instances have about 1.5 to 47.2 wt % of fluorine or about 1.8 to about 44 wt. % of fluorine or about 2.1 to about 41 wt. % of fluorine, based on the total weight of carbon, oxygen, and fluorine elements of the fluorine-containing micro-particles 110.

The fluorine-containing micro-particles 110 of EVOH resin composition 100 may have a particle size with a diameter or a length of the major axis across a cross-sectional area of 0.5 to about 19 μm, 1.0 to about 19 μm or, preferably, 1.2 to about 16 μm. The size of the fluorine-containing micro-particles may be controlled by controlling the type or species of fluoropolymer, the amount of fluoropolymer, and the ethylene content of the EVOH copolymer. If the fluorine-containing micro-particle is a sphere, the diameter of a cross-sectional area of the fluorine-containing micro-particle is used to determine if the fluorine-containing micro-particle has a desirable particle size. In a case where the fluorine-containing micro-particle is not a sphere and/or the cross section of fluorine-containing micro-particle has a shape other than a circle, such as an ellipse or agglomeration, the length of the major axis of a cross-sectional area of the fluorine-containing micro-particle is used to determine if the fluorine-containing micro-particle has a desirable particle size. The definition of the major axis is the axis with the largest length. In some instances, all of the fluorine-containing micro-particles 110, as assessed over a cross section of an EVOH resin composition 100, have a particle size of not greater than 20 µm, such as not greater than 19 µm, not greater than 18 µm, not greater than 16 µm, not greater than 14 µm, or not greater than 12 µm. In other words, in some instances, none of the fluorine-containing micro-particles 110 have a particle size of greater than 20 µm, such as greater than 19 µm, greater than 18 µm, greater than 16 µm, greater than 14 µm, or greater than 12 µm. The fluorine-containing micro-particles 110 may have a particle size of 0.1 µm or more, 0.3 µm or more, 0.5 µm or more, or 0.7 µm or more. For example, EVOH resin composition 100 may have fluorine-containing micro-particles 110 with a particle size of 1.0 to about 19 µm or 1.2 to about 16 µm. In some instances, all of fluorine-containing micro-particles 110, as assessed over a cross section of an EVOH resin composition 100, are within the desired particle ranges discussed herein. In some cases, however, a majority of fluorine-containing micro-particles 110, as assessed over a cross section of an EVOH resin composition 100, are within the desired particle ranges. Exemplary procedures for determining the particle size within the desired range may include: (a) the amount of fluoropolymer, (b) the ethylene content of EVOH, (c) the type of fluoropolymer (d) the temperature in extruder and (e) the rotational frequency of screw.

Figure 2:
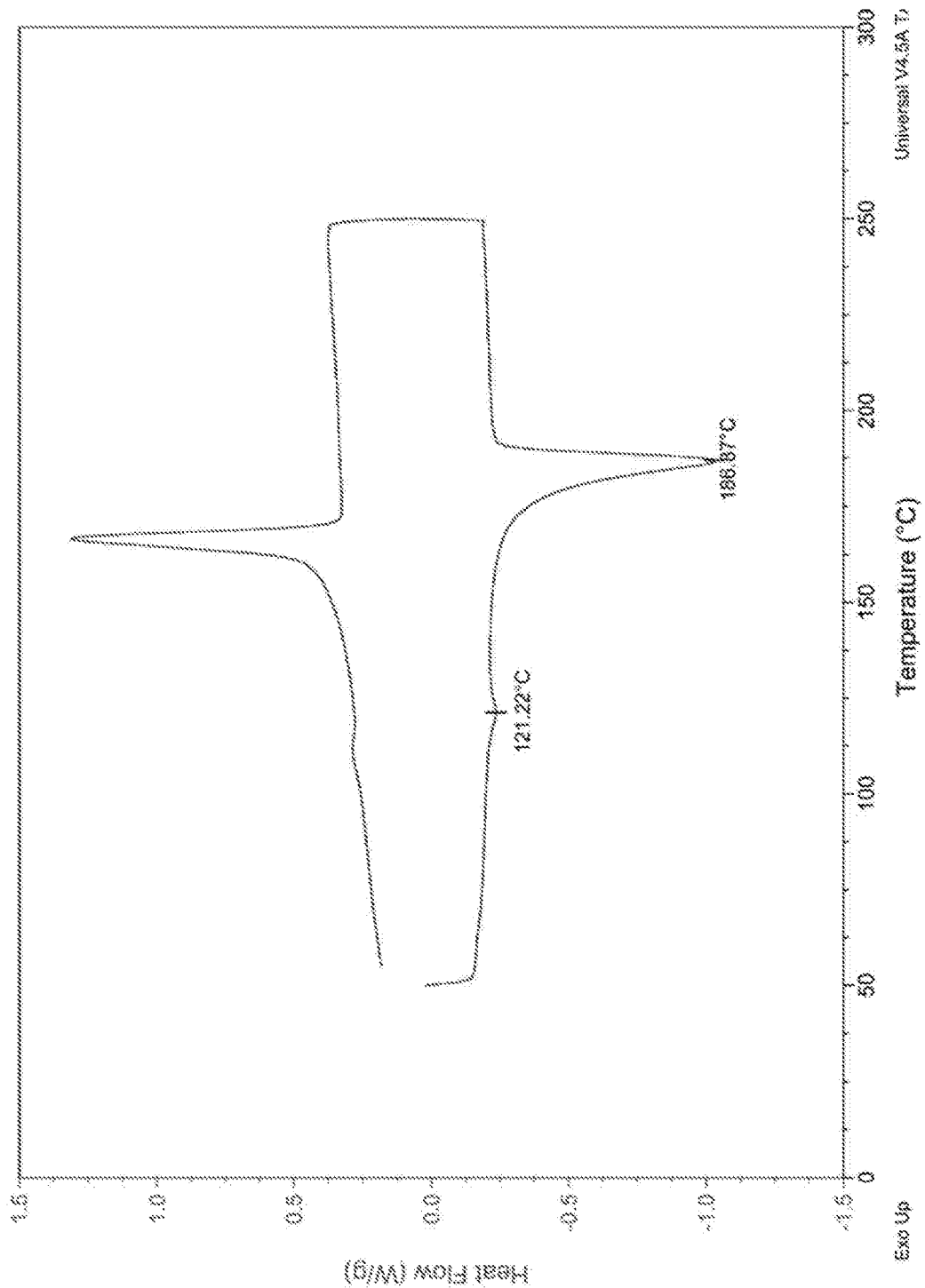
FIG. 2 is a graph of the two melting point temperatures of an exemplary EVOH resin composition according to aspects of the disclosure.

As illustrated by FIG. 2, EVOH resin composition 100 may have at least two melting point temperatures. In some instances, one (e.g., a first) of the melting point temperatures of EVOH resin composition 100 is from about 100° C. to about 140° C.—e.g., from about 105° C. to about 135° C., about 110° C. to about 135° C., or about 120° C. to about 130° C. Additionally or alternatively, one (e.g., a second) of the melting point temperatures may be from about 150° C. to about 195° C.—e.g., about 158° C. to about 190° C. or about 164° C. to about 187° C. In some instances, EVOH resin composition 100 has at least three different melting point temperatures. In other instances, EVOH resin composition 100 includes at least four, at least five, or at least six different melting point temperatures. Additionally and/or alternatively, EVOH resin composition 100 may have a degree of saponification of 90 mole % or more, preferably 95 mole % or more, preferably 97 mole % or more, preferably is 99.5 mole % or more.

The EVOH resin composition 100 thereof may be free of or substantially free of polyalkyleneoxides. For example, EVOH resin composition 100 may have less than 5 wt. %, such as less than 4 wt. %, less than 3 wt. %, less than 2 wt. %, less than 1 wt. %, or less than 0.5 wt. % of polyalkyleneoxides.

Figure 3:
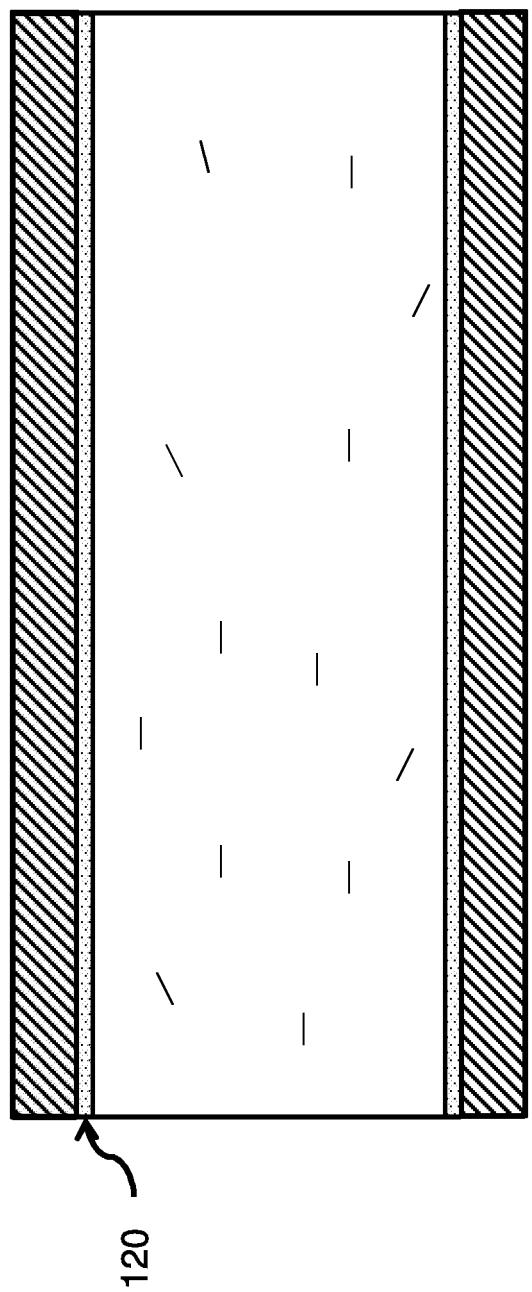
FIG. 3 is a cross-sectional depiction of an extruder with melted EVOH resin compositions according to aspects of the disclosure flowing therethrough.

EVOH resin composition 100 advantageously enables more efficient manufacture of EVOH films formed therefrom. For example, EVOH resin composition 100 may improve precipitation at the die and reduce screw sticking problems during manufacture of EVOH films. Suitable processes and equipment for the manufacture of EVOH films may include those readily known by one of ordinary skill in the art. By utilizing fluoropolymers that are partially miscible (and partially immiscible) and producing EVOH resin composition 100 containing fluorine-containing micro-particle(s) 110, the inventors believe that a portion of the fluoropolymers segregates and forms a coating layer 120 on the inner surface of the extruder. FIG. 3 depicts the formation of a coating layer 120 on the inner surface of an extruder by a portion of the fluoropolymers of an EVOH pellet disclosed herein. Additionally, the EVOH pellets may advantageously enable the extrusion process to occur at increased temperatures without discoloring the produced EVOH film, as the layer of fluorinated polymer coating the extruder inner wall may protect the EVOH resin flowing through the extruder.

In additional an aspect of the disclosure, provided are EVOH resin composition having a melting pressure of 1.7 to 7.0 MPa at a shear rate of 20 s$^{-1}$ and a temperature of 190° C. It was surprisingly discovered that EVOH resin composition having improved properties can be obtained under a broad range of ethylene content if the melting pressure of EVOH resin composition is within the range of 1.7 to 7.0 MPa at a shear rate of 20 s$^{-1}$ and a temperature of 190° C. In this invention, as long as the EVOH resin composition 100 containing the fluorine-containing micro-particles 110 within the desired ranges of melting pressure, the processability, the mechanical properties, and the film appearance are improved. The EVOH resin composition may include one or more of the features, attributes, or properties of the EVOH resins and/or pellets discussed herein. By adding the fluoropolymer, it can help EVOH resin composition during the screw processing. In particular, the fluoropolymer attaches to the inner wall of the screw extruder, which reduces the flow resistance of the EVOH resin composition through the screw extruder. A capillary rheometer may be used to simulate the behavior of EVOH in the screw extruder. Typically, one of the temperatures utilized for EVOH processing is 190° C. and, thus, this temperature is also commonly used for analyzing the melting behavior of EVOH resin compositions. The shear rate of 20 s$^{-1}$ is also under the range of shear rate usually utilized while EVOH processing. Moreover, under the low shear rate, it can better reflect the difference of melting behavior. As described above, the temperature of 190° C. and shear rate of 20 s$^{-1}$ are the representative parameter in the field of EVOH processing. According to an aspect of this invention, by controlling the melt pressure in the capillary to a specific range, the EVOH can have good film appearance, processing stability characteristics and improved flexibility and mechanical properties.

A typical EVOH resin composition may comprise an ethylene-vinyl alcohol copolymer, and one or more fluorine-containing micro-particles, wherein the ethylene-vinyl alcohol copolymer resin composition has a melting pressure of 1.7 to 7.0 MPa at a shear rate of 20 s$^{-1}$ and a temperature of 190° C. The melting pressure of the EVOH resin composition may range from 1.7 to 7.0 MPa, 1.7 to about 6.8 MPa, 1.7 to about 6.5 MPa, 1.7 to about 6.2 MPa, 1.7 to about 5.9 MPa, 1.7 to about 5.6 MPa; about 2 to about 6.8 MPa, about 2 to about 6.5 MPa, about 2 to about 6.2 MPa, about 2 to about 5.9 MPa, about 2 to about 5.6 MPa; about 2.3 to about 6.8 MPa, about 2.3 to about 6.5 MPa, about 2.3 to about 6.2 MPa, about 2.3 to about 5.9 MPa, about 2.3 to about 5.6 MPa; about 2.6 to about 6.8 MPa, about 2.6 to about 6.5 MPa, about 2.6 to about 6.2 MPa, about 2.6 to about 5.9 MPa, about 2.6 to about 5.6 MPa; about 2.9 to about 6.8 MPa, about 2.9 to about 6.5 MPa, about 2.9 to about 6.2 MPa, about 2.9 to about 5.9 MPa, about 2.9 to about 5.6 MPa; about 3.2 to about 6.8 MPa, about 3.2 to about 6.5 MPa, about 3.2 to about 6.2 MPa, about 3.2 to about 5.9 MPa, about 3.2 to about 5.6 MPa; about 3.5 to about 6.8 MPa, about 3.5 to about 6.5 MPa, about 3.5 to about 6.2 MPa, about 3.5 to about 5.9 MPa, about 3.5 to about 5.6 MPa; about 3.9 to about 6.8 MPa, about 3.9 to about 6.5 MPa, about 3.9 to about 6.2 MPa, about 3.9 to about 5.9 MPa, about 3.9 to about 5.6 MPa; about 4.2 to about 6.8

MPa, about 4.2 to about 6.5 MPa, about 4.2 to about 6.2, MPa about 4.2 to about 5.9 MPa, or about 4.2 to about 5.6 MPa, at a shear rate of 20 s$^{-1}$ and a temperature of 190° C.

The EVOH resin composition can, in some cases, contain a boron compound and/or boron acid and/or cinnamic acid and/or alkali metal and/or conjugated polyene and/or lubricant and/or alkali earth metal. The substances described above may lead to better properties in the EVOH resin composition.

The EVOH resin composition may have a melting force of about 0.04 to about 2.4 kN at a shear rate of 20 s$^{-1}$ and a temperature of 190° C. For example, the melting force may be about 0.04 to about 2.4 kN, about 0.04 to about 2.0 kN, about 0.04 to about 1.7 kN, about 0.04 to about 1.4 kN, about 0.04 to about 1.1 kN, about 0.04 to about 1.0 kN, about 0.04 to about 0.8 kN; about 0.06 to about 2.4 kN, about 0.06 to about 2.0 kN, about 0.06 to about 1.7 kN, about 0.06 to about 1.4 kN, about 0.06 to about 1.1 kN, about 0.06 to about 1.0 kN, about 0.06 to about 0.8 kN; about 0.08 to about 2.4 kN, about 0.08 to about 2.0 kN, about 0.08 to about 1.7 kN, about 0.08 to about 1.4 kN, about 0.08 to about 1.1 kN, about 0.08 to about 1.0 kN; about 0.1 to about 2.4 kN, about 0.1 to about 2.0 kN, about 0.1 to about 1.7 kN, about 0.1 to about 1.4 kN, about 0.1 to about 1.1 kN, at a shear rate of 20 s$^{-1}$ and a temperature of 190° C.

Additionally or alternatively, according to further aspects of the disclosure, the EVOH resin composition may have fluorine-containing micro-particles and a boron content of 10 to 450 ppm. Without being limited to any specific theory, it is believed that the addition of a boron compound in EVOH resin composition having fluorine-containing micro-particles, such that the boron content of the EVOH is from 10 to 450 ppm, reduces or eliminates the sticking of the EVOH resin composition during extrusion through a screw extruder and further improves the film thickness uniformity and flexibility. In some instances, such EVOH resin compositions may clean the screw extruder during the extrusion process by removing or at least partially removing EVOH resin previously stuck to the inner surfaces of the screw extruder.

A typical EVOH resin composition may comprise an ethylene-vinyl alcohol copolymer; one or more fluorine-containing micro-particles; and a boron compound, where the ethylene-vinyl alcohol copolymer resin composition has a boron content of 10 to 450 ppm. In some instances, the EVOH resin composition may have a boron content of 10 to 450 ppm, 10 to about 400 ppm, 10 to about 350 ppm, 10 to about 300 ppm, 10 to about 275 ppm, 10 to about 250 ppm, 10 to about 225 ppm, 10 to about 200 ppm, 10 to about 175 ppm; about 20 to 450 ppm, about 20 to about 400 ppm, about 20 to about 350 ppm, about 20 to about 300 ppm, about 20 to about 275 ppm, about 20 to about 250 ppm, about 20 to about 225 ppm, about 20 to about 200 ppm, about 20 to about 175 ppm; about 60 to 450 ppm, about 60 to about 400 ppm, about 60 to about 350 ppm, about 60 to about 300 ppm, about 60 to about 275 ppm, about 60 to about 250 ppm, about 60 to about 225 ppm, about 60 to about 200 ppm, about 60 to about 175 ppm; about 100 to 450 ppm, about 100 to about 400 ppm, ppm, about 100 to about 350 ppm, about 100 to about 300 ppm, about 100 to about 275 ppm, about 100 to about 250 ppm, about 100 to about 225 ppm, about 100 to about 200 ppm, about 100 to about 175 ppm; about 140 to 450 ppm, about 140 to about 400 ppm, about 140 to about 350 ppm, about 140 to about 300 ppm, about 140 to about 275 ppm, about 140 to about 250 ppm, about 140 to about 225 ppm, about 140 to about 200 ppm; about 180 to 450 ppm, about 180 to about 400 ppm, about 180 to about 350 ppm, about 180 to about 300 ppm, about 180 to about 275 ppm, about 180 to about 250 ppm, about 180 to about 225 ppm; about 220 to 450 ppm, about 220 to about 400 ppm, about 220 to about 350 ppm, about 220 to about 300 ppm, about 220 to about 275 ppm, based on the total weight of the EVOH resin composition. When the boron content of EVOH resin composition is within a certain range, it can increase the viscosity of the EVOH resin composition and reduce the chance of the EVOH resin composition sticking to the screw, or remove the EVOH on the screw, so that the material has a self-cleaning function, which further improving the film thickness uniformity. In addition to a boron content of 10 to 450 ppm the EVOH resin composition can, in some cases, contain cinnamic acid, alkali metal, conjugated polyene, lubricant, alkali earth metal, salts thereof, and/or mixtures thereof. The substances described above are common substance usually existing in the EVOH resin composition leading to better properties.

The boron compounds may, in some instances, include boric acid or a metal salt thereof. Examples of the metal salt include, but are not limited to, calcium borate, cobalt borate, zinc borate (e.g. zinc tetraborate, zinc metaborate), potassium aluminum borate, ammonium borate (e.g. ammonium metaborate, ammonium tetraborate, ammonium pentaborate, ammonium octaborate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. copper (II) borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganese (I) borate, manganese metaborate, manganese tetraborate), lithium borate (e.g. lithium metaborate, lithium tetraborate, lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

According to another aspect of the disclosure, provided is an EVOH film formed from the EVOH resin composition 100 thereof. The EVOH film has a Charpy impact strength of at least 2.3 KJ/m$^2$ according to ISO 179-1 at a temperature 23° C. and an elongation at break of at least 17.8% according to ISO 527-2 at a temperature of 23° C. For some embodiments, the EVOH film may have a Charpy impact strength of at least 3 KJ/m$^2$, at least 4.5 KJ/m$^2$, at least 5.5 KJ/m$^2$, or at least 6.5 KJ/m$^2$ according to ISO 179-1 at a temperature 23° C. For obtaining the above Charpy impact strength values, the test specimens should be maintained at a relative humidity of 50%±5% and a temperature of 23° C.±2° C. for 16 hours before being testing using the ISO 179-1 procedure. Additionally, the impact energy should be set to 7.5 J, the impact direction should be edgewise, the specimen type should be 1 eA, the average width of the specimen should be 10.06 mm, and the average thickness of the specimen should be 3.94 mm. The depth of the notch for testing should be 8.09 mm, the testing temperature should be 23° C.±2° C., and the fracture type should be C. The EVOH film may have an elongation breakage percentage of at least 20% according to ISO 527-2 at a temperature of 23° C. In some instances, the EVOH film has an elongation breakage percentage of at least 21%, at least 22%, at least 23%, or at least 24% according to ISO 527-2 at a temperature of 23° C. For obtaining the above values for the elongation at break, the testing method edition should be 2012, the testing speed 50 mm/min, the specimen type should be 1A, and the average thickness of the specimen should be 3.99 mm.

In accordance with yet another aspect of the disclosure, provided is a multi-layer structure having at least one layer formed from the EVOH resin composition disclosed herein; at least one polymer layer; and at least one adhesive layer. The polymer layer may be chosen from a low density polyethylene layer, a polyethylene-graft-maleic-anhydride layer, a polypropylene layer, a nylon layer, and a combination thereof. The adhesive layer may be a tie layer. The tie layer may be e.g., ARKEMA OREVAC 18729, which is available from ARKEMA.

EXAMPLES

The following non-limiting examples of aspects of the invention are provided primary for the purpose of elucidating aspects of the invention and the benefits derived therefrom.

Example 1

Four fluoropolymers (Example Fluoropolymers A-D) were prepared according to aspects of the disclosure. Example Fluoropolymers A-D were subsequently used for producing ethylene vinyl alcohol copolymer (hereafter "EVOH") resin composition according to the instant disclosure. Although Example Fluoropolymers A-D were prepared according to the specific process disclosed below, other types of fluoropolymers may be used for addition with the EVOH.

Example Fluoropolymer A

Example Fluoropolymer A was produced using an autoclave as batch reactor. The autoclave had an internal volume of about 20 liters and was equipped with an electromagnetic induction stirrer. The autoclave was sufficiently scavenged with nitrogen gas ($N_2$) and was subsequently filled with reduced pressure nitrogen gas five times.

While applying a reduced pressure within the autoclave, 6,960 grams (g) of deoxygenated pure water, 3,204 g of 1,1,2-trichloro-1,2,2-trifluoroethane, and 3.5 g of methylcellulose was added into the autoclave. The methylcellulose had a viscosity of 50 cp and was stirred into the composition within the autoclave at 450 rpm to act as a suspension stabilizer. The composition within the autoclave was kept at a temperature of 52° C.

A monomer composed of 25.3 wt. % of vinylidene fluoride (VDF), 68.6 wt. % of hexafluoropropylene (HFP), 6.1 wt. % of tetrafluoroethylene (TFE), was mixed into the batch as a charging gas, and charged to 10 $kg/cm^2$. Subsequently, 45.6 g of a solution of about 90 wt. % of 1,1,2-trichloro-1,2,2-trifluoroethane and 10 wt. % of diisopropyl peroxydicarbonate was charged as a catalyst to initiate polymerization. The diisopropyl peroxydicarbonate acted as an initiator for initiating polymerization. Because the pressure is reduced during the polymerization reaction, a mixed monomer having 44.7 wt. % of VDF, 32.5 wt. % of HFP, and 22.8 wt. % of TFE was added to increase the pressure back up to 10 $kg/cm^2$. After the completion of the polymerization reaction, the remaining mixed monomer was scavenged, and the resulting suspension was dehydrated with a centrifugal separator, washed with DI water, and then vacuum dried at 100° C. to obtain about 7.5 kg of Example Fluoropolymer A.

Example Fluoropolymer B

Example Fluoropolymer B was produced using a similar autoclave and set up as used to produce Example Fluoropolymer A. The autoclave was also repeatedly filled with reduced pressure-$N_2$ five times.

While applying a reduced pressure within the autoclave, 7200 g of deoxygenated pure water, 3250 g of 1,1,2-trichloro-1,2,2-trifluoroethane and 4 g of methylcellulose was added into the autoclave. The methylcellulose had a viscosity of 50 cp and was stirred into the batch within the autoclave at 500 rpm to act as a suspension stabilizer. The batch within the autoclave was kept at a temperature of 52° C.

A monomer composed of 25 wt. % of VDF, 55 wt. % of HFP, and 20 wt. % of TFE was used as a charging gas, and charged to 20 $kg/cm^2$. Subsequently, 40 g of a solution of about 85 wt. % 1,1,2-trichloro-1,2,2-trifluoroethane and 15 wt. % of diisopropyl peroxydicarbonate was charged as a catalyst to initiate polymerization. The diisopropyl peroxydicarbonate acted as an initiator for initiating polymerization. Because the pressure was reduced during the polymerization reaction, a mixed monomer of 40 wt. % of VDF, 35 wt. % of HFP, and 25 wt. % of TFE was added to increase the pressure back up to 20 $kg/cm^2$. After the completion of the polymerization reaction, the remaining mixed monomer was scavenged, and the resulting suspension was dehydrated with a centrifugal separator, washed with DI water, and then vacuum dried at 100° C. to obtain about 6 kg of Example Fluoropolymer B.

Example Fluoropolymer C

Example Fluoropolymer C was produced using an autoclave and an induction stirrer that were similar to those used to produce Example Fluoropolymer A. The autoclave was sufficiently scavenged with nitrogen gas, and charged with 3 liters of a composition of deoxidized purified water and 30 g of ammonium perfluorodecanoate, which acted as emulsifier. The composition within the autoclave was heated to 60° C. and stirred at 380 rpm.

The autoclave was then charged with a gas mixture of about 70 wt. % of VDF and about 30 wt. % of HFP until the internal pressure of the autoclave reached 20 $kg/cm^2$. Subsequently, 40 g of a solution contain about 80 wt. % of 1,1,2-trichloro-1,2,2-trifluoroethane and 20 wt. % of diisopropyl peroxydicarbonate was added into the autoclave using nitrogen. The diisopropyl peroxydicarbonate acted as an initiator for initiating polymerization.

The internal pressure within the autoclave was maintained at 20 $kg/cm^2$ during polymerization by successively injecting a gas mixture of VDF (62 wt. %) and HFP (38 wt. %). Because the polymerization rate decreased along with the progress of polymerization, an additional 30 g of solution containing about 80 wt. % of a 1,1,2-trichloro-1,2,2-trifluoroethane solution and 20 wt. % of diisopropyl peroxydicarbonate was injected using nitrogen gas 3 hours after the initiation of the polymerization reaction. The monomers were polymerized for an additional 3 hours and the resulting suspension was dehydrated with a centrifugal separator, washed with DI water, and then vacuum dried at 100° C. to obtain about 7.2 kg of Example Fluoropolymer C.

Example Fluoropolymer D

Example Fluoropolymer D was produced using an autoclave having a volume of about 3 liter, which served as a batch reactor. The autoclave had an electromagnetic induction stirrer. A batch of 936 g of DI water, 0.36 g of methylcellulose, 360 g of VDF, 0.3 g of tert-butylperoxy-privalate, 0.36 g of sodium pyrophosphate, 0.36 g of acidic sodium pyrophosphate, and 1.8 g of diethyl carbonate was charged and added into the autoclave. The batch was stirred at 10° C. for 30 minutes, and then warmed to 45° C. for 140 minutes.

The maximum pressure within the autoclave was 6 MPa. The polymerization of the monomers was terminated when the pressure in the autoclave was reduced to 2.5 MPa, which occurred 15 hours after the initial warming of the monomers. After the polymerization was completed, the polymer slurry was withdrawn, dehydrated, washed with DI water, dehydrated and then dried at 80° C. for 24 hours to obtain a vinylidene fluoride polymer (Example Fluoropolymer D) having an inherent viscosity of 2.05 dl/g and a bulk density of 0.225 g/ml at a yield of 55%.

Example 2

A non-limiting method for preparing EVOH pellets formed from EVOH resin composition is provided below. Twenty seven non-limiting, exemplary EVOH resin composition containing fluoro micro-particles (Example EVOH 1-27) and five comparative EVOH resin composition (Comparative EVOH 1-5) were prepared according to methods similar to the method disclosed below. However, the specific methods for producing EVOH 1-27 and Comparative EVOH 1-5 typically varied from the method disclosed below in one or more ways.

An ethylene-vinyl acetate copolymer (hereafter "EVAC") with an ethylene content of 29%, by mole, underwent saponification by 99.5% to produce EVOH polymers. Subsequently, the EVOH was dissolved into solution comprising methanol and water in a ratio of 70:30. After dissolving the EVOH into the solution of methanol and water, the solution had a 41 wt. % solid content of EVOH and was maintained at a temperature of 60° C.

The solution of methanol, water, and EVOH was then pelletized using underwater pelletization. Specifically, the solution of methanol, water, and EVOH was pumped into feeding tube with a flow rate of 120 L/min. The solution was transferred to an inlet pipe, which had a diameter of 2.8 mm, and then cut by a rotating knife at a speed of 1,500 rpm. The EVOH pellets were cooled by adding water having a temperature of 5° C. The EVOH were subsequently centrifuged to separate the EVOH pellet into particles. The separated EVOH particles were washed with water and dried to obtain an EVOH pellet.

The EVOH pellet was blended with a fluoropolymer, e.g., such as those discussed in Example 1, at certain ratios and then transferred into a twin screw extruder. The twin screw extruder had different temperatures along thirteen zones, as summarized in Table 1, below. After compounding, strand cutting was employed at a temperature of 25° C. to produce EVOH containing micro-particles having a fluorine element (also referred to herein as fluoro micro-particles). In Table 1, "EV27" refers to an EVOH having an ethylene content of 27 mole %, "EV29" refers to an EVOH having an ethylene content of 29 mole %, "EV32" refers to an EVOH having an ethylene content of 32 mole %, "EV38" refers to an EVOH having an ethylene content of 38 mole %, and "EV44" refers to an EVOH having an ethylene content of 44 mole %.

TABLE 1

| Twin Screw Extruder Process Condition (° C.) | | | | | | | | | | | | | |
|---|---|---|---|---|---|---|---|---|---|---|---|---|---|
| Barrel | Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 |
| EV27 | 190 | 190 | 195 | 195 | 195 | 200 | 200 | 205 | 205 | 210 | 210 | 215 | 215 |
| EV29 | 190 | 190 | 195 | 195 | 195 | 200 | 200 | 205 | 205 | 205 | 210 | 210 | 215 |
| EV32 | 185 | 185 | 190 | 190 | 190 | 195 | 195 | 200 | 200 | 205 | 205 | 210 | 210 |
| EV38 | 175 | 175 | 185 | 185 | 185 | 195 | 195 | 195 | 200 | 200 | 205 | 205 | 205 |
| EV44 | 170 | 170 | 170 | 170 | 175 | 175 | 180 | 180 | 180 | 185 | 185 | 190 | 195 |

Example 3

Example EVOH 1-27 were each formed into a film according to the method described below. Films were produced by feeding Example EVOH 1-27 and Comparative EVOH 1-5 into a single layer T-die cast film extruder (Optical Control System MEV4). The films formed from Example EVOH 1-27 and Comparative EVOH 1-5 each had a thickness of 20 μm. The temperature of the extruder was set to 220° C., while the temperature of the tie was set to 230° C. The rotational frequency of the screw was 7 rotations/minutes (rpm).

Example 4

Example EVOH 1-27 and Comparative EVOH 1-5 were assessed to determine the properties of such EVOH and the films formed therefrom. As mentioned above, Example EVOH 1-27 were prepared according to methods similar to the method described in Example 2, above. However, the methods for producing EVOH 1-27 varied to produce EVOH having different amounts of ethylene contents, different fluoropolymers, and different amounts of such fluoropolymers. Comparative EVOH 1-5 were also prepared according to methods similar to that described in Example 2.

Table 2, shown below, provides a summary of certain attributes, namely, the ethylene content of the EVAC, the specific fluoropolymer incorporated into the EVOH pellet, and amount of such fluoropolymer, of Example EVOH 1-27 and Comparative EVOH 1-5.

TABLE 2

| | Ethylene Content of (mole %) EVAC | Example Fluoropolymer No. | Amount of added Fluoropolymer (wt.%) |
|---|---|---|---|
| Example EVOH 1 | 29 | A | 1 |
| Example EVOH 2 | 29 | A | 2 |
| Example EVOH 3 | 29 | A | 5 |
| Example EVOH 4 | 29 | A | 0.1 |

TABLE 2-continued

| | Ethylene Content of (mole %) EVAC | Example Fluoropolymer No. | Amount of added Fluoropolymer (wt.%) |
|---|---|---|---|
| Example EVOH 5 | 29 | A | 0.3 |
| Example EVOH 6 | 44 | A | 0.1 |
| Example EVOH 7 | 44 | A | 0.3 |
| Example EVOH 8 | 44 | A | 1 |
| Example EVOH 9 | 44 | A | 2 |
| Example EVOH 10 | 44 | A | 5 |
| Example EVOH 11 | 32 | A | 2 |
| Example EVOH 12 | 38 | A | 2 |
| Example EVOH 13 | 27 | A | 1 |
| Example EVOH 14 | 27 | A | 2 |
| Example EVOH 15 | 27 | A | 4 |
| Example EVOH 16 | 32 | A | 1 |
| Example EVOH 17 | 38 | A | 3 |
| Example EVOH 18 | 48 | A | 1 |
| Example EVOH 19 | 48 | A | 2 |
| Example EVOH 20 | 48 | A | 3 |
| Example EVOH 21 | 32 | C | 2 |
| Example EVOH 22 | 32 | B | 0.5 |
| Example EVOH 23 | 32 | B | 1 |
| Example EVOH 24 | 32 | B | 2 |
| Example EVOH 25 | 32 | B | 3 |
| Example EVOH 26 | 29 | D | 1 |
| Example EVOH 27 | 29 | D | 3 |
| Comparative EVOH 1 | 29 | — | 0 |
| Comparative EVOH 2 | 29 | A | 0.06 |
| Comparative EVOH 3 | 29 | A | 8 |
| Comparative EVOH 4 | 44 | — | 0 |
| Comparative EVOH 5 | 44 | A | 8 |

The properties of Example EVOH 1-27 were assessed by comparing certain Example EVOH to the Comparative EVOH having at least one feature that is the same as such Example EVOH. For example, Table 3 provides a comparison of Example EVOH 1-5 with Comparative EVOH 1-3, which were all produced with an EVAC having an ethylene content of 29 mole %, and a comparison of Example EVOH 6-10 to Comparative EVOH 4 and 5, which all were produced with an EVAC having an ethylene content of 44 mole %.

TABLE 3

| | Fluorine Content (wt %) | Particle Size range (μm) | Dispersion | 1st Melting Point Temp. (C. °) | 2nd Melting Point Temp. (C. °) |
|---|---|---|---|---|---|
| 29 mol % of Ethylene Content of EVAC | | | | | |
| Example EVOH 1 | 3.5~41 | 1.2~5 | ○ | 121 | 186.9 |
| Example EVOH 2 | 8~44 | 1.6~8 | ○ | 122 | 186.4 |
| Example EVOH 3 | 9~43 | 1.5~18 | ○ | 125.1 | 186.3 |
| Example EVOH 4 | 1.8~12 | 0.5~5 | ○ | 125.2 | 186.8 |
| Example EVOH 5 | 2.1~14.5 | 0.6~6 | ○ | 123.4 | 185.8 |
| Comparative EVOH 1 | 0 | NA | X | NA | 187 |
| Comparative EVOH 2 | ~0 | NA | X | NA | 186.8 |
| Comparative EVOH 3 | 16~48.5 | 0.6~40 | X | 128 | 186.6 |
| 44 mol % of Ethylene Content of EVAC | | | | | |
| Example EVOH 6 | 1.5~10.5 | 0.7~3 | ○ | 134.6 | 165.6 |
| Example EVOH 7 | 2~15.6 | 0.7~5 | ○ | 126.3 | 164.7 |
| Example EVOH 8 | 3.6~30.6 | 1.2~9 | ○ | 110 | 164.7 |
| Example EVOH 9 | 3.8~36.3 | 1.6~10 | ○ | 112 | 164.4 |
| Example EVOH 10 | 10~40.6 | 2.5~12 | ○ | 123.3 | 164.8 |
| Comparative EVOH 4 | 0 | NA | X | NA | 166 |
| Comparative EVOH 5 | 12~45 | 0.6~40 | X | 130.6 | 165 |

To assess the degree of dispersion of the micro-particles within Example EVOH 1-10 and the Comparative EVOH 1-5 (if any), at one EVOH pellet from Example EVOH 1-10 and Comparative EVOH 1-5 was cut to produce a specimen with a thickness of 0.5 mm. The cut surface of each specimen EVOH pellet was then assessed using an optical microscope (a LEICA DM2700M optical microscope sold by LEICA MICROSYSTEMS), a CCD Camera (such as those produced by LEICA MICROSYSTEMS), and analyzed with software (e.g., LAS V4.11 software). The software (e.g., LAS V4.11 software) determined the length of the cross-sectional area of each of the fluorine containing micro-particles. A "X" was given to the EVOH pellet(s) if one or more micro-particles had a particle size with a diameter or a length of the major axis that is larger than 20 μm or if no micro-particles were formed, while a "0" was given if excellent dispersion was exhibited without agglomeration.

The fluorine content was determined using a Model JSM-6390 scanning electron microscope, produced by Jeol USA Inc., which was set to a voltage of 15 KV, with a working distance 15 mm. Energy dispersive spectroscopy analysis was completed using an Oxford Instrument INCA 7582. The spot size of the scanning electron microscope was adjusted to make the dead time of the energy dispersive spectroscopy less than 35%. The acquisition rate for the energy dispersive spectroscopy analysis was set to 1 Kcps. Using the measurements obtained from the scanning electron microscope and energy dispersive spectroscopy, the fluorine content was calculated as a wt. % based on the total content of carbon, oxygen, and fluorine using the element signal peaks of $k_\alpha 0.2774$ keV for carbon, $k_\alpha 0.5249$ keV for oxygen, and $k_\alpha 0.6768$ keV for fluorine. Additionally, the scanning electron microscope was specifically aimed to the micro-particles during the energy dispersive spectroscopy so that the fluorine content primarily reflects the fluorine in the micro-particles. Specifically, each of Example EVOH 1-10 and the Comparative EVOH 1-5 were evaluated in ten places.

Example EVOH 1-10 each exhibited excellent dispersion of the micro-particles containing fluorine and desired micro-particle sizes in accordance with the desired ranges described herein, while Comparative Examples 1-5 exhibited poor dispersion and micro-particles (if any were present) having a size outside of such desired ranges. As shown in Table 3, although Comparative EVOH 3 had two melting point temperatures within the desired ranges discussed herein and was produced with an EVAC having an ethylene content that was the same as for Example EVOH 1-5, Comparative EVOH 3 exhibited poor dispersion of the micro-particles and also exhibited severe agglomeration, leading to a micro-particle with a size of about 40 μm. By way of another example, Comparative EVOH 5 was produced with an EVAC having an ethylene content and fluoropolymer that was the same as Example EVOH 6-10. However, Comparative EVOH 5 had an amount of fluoropolymer that was higher than the desired range discussed herein and exhibited poor dispersion of the micro-particles containing fluorine as well as micro-particles sizes outside of the desired range discussed herein. Additionally, Comparative EVOH 1 and 4 were not produced with a fluoropolymer and, thus, no micro-particles were exhibited.

Films were formed from each of Example EVOH 1-10 and Comparative EVOH 1-5 in accordance with methods similar that described in Example 3. The films were assessed to determine the appearance of the film, the precipitation at the die, the Charpy impact strength of the film, and the elongation breakage of the film. A summary of the properties of the films formed from Example EVOH 1-10 and Comparative EVOH 1-5 is provided below in Table 4.

10 within a square meter. The number of fisheyes was tested using a charged coupled device (CCD) sensor and FSA-100 devising using FSA-100 V.8 software. Additionally, an "O" was given if no precipitation at the die was exhibited and a "X" was given if precipitation at the die was exhibited.

For the Charpy impact strength values, the test specimens were maintained at a relative humidity of 50%±5% and a temperature of 23° C.±2° C. for 16 hours before being testing using the ISO 179-1 procedure. The applied impact energy was 7.5 J, the impact direction was edgewise, the average width of the specimen was 10.06 mm, and the average thickness of the specimen was 3.94 mm. The depth of the notch was 8.09 mm, the testing temperature was 23° C.±2° C., and the fracture type was C.

For the elongation at break, the testing method was according to ISO 527-2 at a temperature of 23° C. and the edition was 2012, the testing speed was 50 mm/min, the specimen type was 1A, and the average thickness of the specimen was 3.99 mm.

The films of Example EVOH 1-10 did not exhibit precipitation at the die and had less than three fisheyes with a size greater than 200 μm within a square meter. The Charpy impact strength of the films of Example EVOH 1-10 ranged from 2.45 to 6.9 KJ/m². The elongation breakage of the films formed from Example EVOH 1-10 ranged from 17.8 to 24.3%.

The films of Comparative EVOH 1, 2, and 4 exhibited precipitation at the die. As shown by a comparison of the film formed from Example EVOH 1 to the film formed from Comparative EVOH 1, the addition of Example Fluoropolymer A provided improved mechanical properties. Additionally, comparing the film of comparative EVOH 1 and 2, with the film of Example EVOH 1-4 shows the charpy impact strength and elongation breakage is significantly improved by controlling the micro-particles size to be within a specific range, as discussed herein. Although the films of Comparative EVOH 3 and 5 did not exhibit precipitation at the die, such films still exhibited greater than 10 fisheyes with a size greater than 200 μm within a square meter.

TABLE 4

|  | Film Appearance | Die Precipitation | Charpy impact Strength (KJ/m²) | Elongation Breakage (%) |
| --- | --- | --- | --- | --- |
| Film of Example EVOH 1 | ○ | ○ | 2.45 | 17.8 |
| Film of Example EVOH 2 | ○ | ○ | 3.19 | 19.9 |
| Film of Example EVOH 3 | ○ | ○ | 3.62 | 20.2 |
| Film of Example EVOH 4 | ○ | ○ | 2.52 | 17.8 |
| Film of Example EVOH 5 | ○ | ○ | 2.52 | 17.6 |
| Film of Comparative EVOH 1 | Δ | X | 2.25 | 17.1 |
| Film of Comparative EVOH 2 | Δ | X | 2.23 | 16.8 |
| Film of Comparative EVOH 3 | X | ○ | 2.64 | 18.5 |
| Film of Example EVOH 6 | ○ | ○ | 3.1 | 22.6 |
| Film of Example EVOH 7 | ○ | ○ | 3.1 | 22.8 |
| Film of Example EVOH 8 | ○ | ○ | 5.45 | 23.9 |
| Film of Example EVOH 9 | ○ | ○ | 6.9 | 24.3 |
| Film of Example EVOH 10 | ○ | ○ | 6.8 | 24.1 |
| Film of Comparative EVOH 4 | Δ | X | 2.8 | 21.8 |
| Film of Comparative EVOH 5 | X | ○ | 5.4 | 23.1 |

For the appearance of the films formed from Example EVOH 1-10 and Comparative EVOH 1-5, a "O" was given if the number of fisheyes with a size greater than 200 μm was less than 3 within a square meter, a "Δ" was given if the number of fisheyes with a size greater than 200 μm was 3 to 10 within a square meter, and a "X" was given if the number of fisheyes with a size greater than 200 μm was greater than While not being limited to any one theory, the inventors believe that the undesired micro-particle size in Comparative EVOH 3 and 5 produced too much agglomeration, which adversely affected the number of fisheyes with a size greater than 200 μm within a square meter of the film. However, when the size of the micro-particles were controlled to within the desired range, the films of the Example EVOH not only showed better mechanical properties, such as charpy impact strength and elongation breakage, but also showed better processability and appearance of the film.

The effect of producing EVOH using EVAC having different ethylene contents was assessed by comparing Example EVOH 1, 3, 8, and 10-20. Table 5, shown below, provides a summary of certain attributes of Example EVOH 1, 3, 8, and 10-20.

TABLE 5

| | Fluorine Content (wt. %) | Particle Size range (μm) | Dispersion | $1^{st}$ Melting Point Temp. (C.°) | $2^{nd}$ Melting Point Temp. (C.°) |
|---|---|---|---|---|---|
| Example EVOH 1 | 3.5~41 | 1.2~5 | ○ | 121 | 186.9 |
| Example EVOH 3 | 9~43 | 1.5~18 | ○ | 125.1 | 186.3 |
| Example EVOH 8 | 3.6~30.6 | 1.2~9 | ○ | 110 | 164.7 |
| Example EVOH 10 | 10~40.6 | 2.5~12 | ○ | 123.3 | 164.8 |
| Example EVOH 11 | 4.6~42 | 1.6~5 | ○ | 115 | 182.6 |
| Example EVOH 12 | 4.8~46.5 | 1.5~8 | ○ | 111 | 171.9 |
| Example EVOH 13 | 3~25 | 2~4.5 | ○ | 124.6 | 189.8 |
| Example EVOH 14 | 5~42 | 2~7 | ○ | 125.2 | 189.6 |
| Example EVOH 15 | 8~46 | 2~8 | ○ | 125.1 | 189.6 |
| Example EVOH 16 | 3.1~30.2 | 2~5 | ○ | 116 | 182.7 |
| Example EVOH 17 | 6.8~47.1 | 2~10 | ○ | 111.5 | 172.1 |
| Example EVOH 18 | 3.7~35.4 | 2.2~15 | ○ | 110.5 | 158.8 |
| Example EVOH 19 | 3.8~42.1 | 2.5~15 | ○ | 112.7 | 158.7 |
| Example EVOH 20 | 6.3~43.5 | 2.8~19 | ○ | 113 | 159 |

The melting point temperatures of the EVOH was determined using a TA-Q200 differential scanning calorimeter (DSC), manufactured by TA instruments, according to the procedure of ISO 11357-3 (2011), utilizing the 1St melting point temperature and $2^{nd}$ melting point temperature from the first run of thermoscan by DSC.

Each of Example EVOH 1, 3, 8, and 10-20 exhibited excellent dispersion of the micro-particles containing fluorine. Moreover, Example EVOH 1, 3, 8, and 10-20 had micro-particles with sizes and fluorine contents in accordance with the desired ranges described herein. Example EVOH 1, 3, 8, and 10-20 each had two melting point temperatures with a first (lower) melting point temperature ranging from 110° C. to 125.2° C. and a second (higher) melting point temperature ranging from 158.7° C. to 189.9° C. Surprisingly, each of the foregoing Example EVOH exhibited improved processability and formed EVOH films having improved mechanical properties, regardless of their ethylene content. Without being limited to any specific theory, the inventors believe that EVOH resins and pellets thereof having micro-particles comprising fluoropolymers and having each particle size under 20 μm improves the processability and the mechanical properties of EVOH films formed therefrom. Notably, the amount of Example Fluoropolymer A did not directly and proportionally correlate to the range of fluorine content in the micro-particles.

Films were formed from Example EVOH 1, 3, 8, 10, 11, and 12 in accordance with methods similar to that described in Example 3. The films were assessed to determine the appearance of such films, the precipitation at the die, the Charpy impact strength of the films, and the elongation breakage of the films using the procedures and the qualitative valuation metrics discussed above. A summary of the properties of the films of Example EVOH 1, 3, 8, 10, 11, and 12 is provided below in Table 6.

TABLE 6

| | Film Appearance | Die precipitation | Charpy impact Strength (KJ/m$^2$) | Elongation Breakage (%) |
|---|---|---|---|---|
| Film of Example EVOH 1 | ○ | ○ | 2.45 | 17.8 |
| Film of Example EVOH 3 | ○ | ○ | 3.62 | 20.2 |
| Film of Example EVOH 8 | ○ | ○ | 5.45 | 23.9 |
| Film of Example EVOH 10 | ○ | ○ | 6.8 | 24.1 |
| Film of Example EVOH 11 | ○ | ○ | 3.1 | 18.2 |
| Film of Example EVOH 12 | ○ | ○ | 2.3 | 20.5 |

The films of Example EVOH 1, 3, 8, 10, 11, and 12 each exhibited no precipitation at the die and had less than three fisheyes with a size greater than 200 μm was less than 3 within a square meter. The Charpy impact strength of the films of Example EVOH 1, 3, 8, 10, 11, and 12 ranged from 2.3 to 6.8 KJ/m$^2$, while the elongation breakage of the films of Example EVOH 1, 3, 8, 10, 11, and 12 ranged from 17.8 to 24.1%.

EVOH produced with Example Fluoropolymers A-D were compared to assess the effect of Example Fluoropolymers A-D on the formed EVOH. Table 7, shown below, provides a summary of certain attributes of Example EVOH 1, 11, and 21-27.

TABLE 7

| | Fluorine Content (wt %) | Particle Size range (μm) | Dispersion | $1^{st}$ Melting Point Temp. (C.°) | $2^{nd}$ Melting Point Temp. (C.°) |
|---|---|---|---|---|---|
| Example EVOH 1 | 3.5~41 | 1.2~5 | ○ | 121 | 186.9 |
| Example EVOH 11 | 4.6~42 | 1.6~5 | ○ | 115 | 182.6 |
| Example EVOH 21 | 6~40 | 2~11 | ○ | 120.7 | 181 |
| Example EVOH 22 | 2.1~30 | 1.3~7 | ○ | 130 | 180.9 |
| Example EVOH 23 | 3.9~42.5 | 1.5~8 | ○ | 118.5 | 181 |
| Example EVOH 24 | 4.2~46.9 | 1.5~8 | ○ | 113.7 | 181.5 |
| Example EVOH 25 | 5~47.2 | 1.6~10 | ○ | 117 | 181.2 |
| Example EVOH 26 | 1.6~20 | 0.6~1.5 | ○ | 132.5 | 185.4 |
| Example EVOH 27 | 2~20 | 0.5~2 | ○ | 133.7 | 185.7 |

Each of Example EVOH 1, 11, and 21-27 exhibited excellent dispersion of the micro-particles containing fluorine. Moreover, Example EVOH 1, 11, and 21-27 had micro-particles with sizes and fluorine contents in accordance with the desired ranges described herein. Example EVOH 1, 11, and 21-27 each had two melting point temperatures with a first (lower) melting point temperature in the range of 113.7° C. to 133.7° C. and a second (higher) melting point temperature in the range of 180.9° C. to 186.9° C.

Films were formed from Example EVOH 1, 11, and 21-27 in accordance with methods similar that described in Example 3. The films were assessed to determine the appearance of the film, the precipitation at the die, the charpy impact strength of the film, and the elongation breakage of the film using the procedures and the qualitative valuation metrics discussed above. A summary of the properties of the films of Example EVOH 1, 11, and 21-27 is provided below in Table 8.

TABLE 8

| | Film Appearance | Die precipitation | Charpy impact Strength (KJ/m$^2$) | Elongation Breakage (%) |
|---|---|---|---|---|
| Film of Example EVOH 1 | ○ | ○ | 2.45 | 17.8 |
| Film of Example EVOH 11 | ○ | ○ | 3.1 | 18.2 |
| Film of Example EVOH 21 | ○ | ○ | 2.9 | 18.4 |
| Film of Example EVOH 22 | ○ | ○ | 2.48 | 17.9 |
| Film of Example EVOH 23 | ○ | ○ | 2.68 | 18.2 |
| Film of Example EVOH 24 | ○ | ○ | 2.9 | 18.6 |
| Film of Example EVOH 25 | ○ | ○ | 3.2 | 19.2 |
| Film of Example EVOH 26 | ○ | ○ | 2.84 | 20.5 |
| Film of Example EVOH 27 | ○ | ○ | 3.3 | 22.4 |

The films formed from Example EVOH 1, 11, and 21-27 each exhibited no precipitation at the die and had less than three fisheyes with a size greater than 200 μm was less than 3 within a square meter. The Charpy impact strength for the films of Example EVOH 1, 11, and 21-27 were in the range of 2.45 to 3.3 KJ/m$^2$, while the elongation breakage for the films of Example EVOH 1, 11, and 21-27 were in the range of 17.8 to 22.4%.

Example 5

Example EVOH 1-4, 6, 8, 10, 12, 22-25, and 27-29 and Comparative EVOH 1, 3, and 6 were prepared in accordance with the procedures described in the above Examples, such as Example 2. Example EVOH 1-4, 6, 8, 10, 12, 22-25, and 27-29 and Comparative EVOH 1, 3, and 6 were each formed into a film according to the method described in Example 3. Table 9, shown below, provides a summary of certain attributes, namely, the ethylene content of the EVAC, the specific fluoropolymer incorporated into the EVOH pellet, and amount of such fluoropolymer, of Example EVOH 1-4, 6, 8, 10, 12, 22-25, and 27-29 and Comparative EVOH 1, 3, 6.

TABLE 9

| | Ethylene Content of EVAC (mole %) | Example Fluoropolymer No. | Amount of added Fluoropolymer (wt. %) |
|---|---|---|---|
| Example EVOH 1 | 29 | A | 1 |
| Example EVOH 2 | 29 | A | 2 |
| Example EVOH 3 | 29 | A | 5 |
| Example EVOH 4 | 29 | A | 0.1 |
| Example EVOH 6 | 44 | A | 0.1 |
| Example EVOH 8 | 44 | A | 1 |
| Example EVOH 10 | 44 | A | 5 |
| Example EVOH 12 | 38 | A | 2 |
| Example EVOH 22 | 32 | B | 0.5 |
| Example EVOH 23 | 32 | B | 1 |
| Example EVOH 24 | 32 | B | 2 |
| Example EVOH 25 | 32 | B | 3 |
| Example EVOH 27 | 29 | D | 3 |
| Example EVOH 28 | 32 | C | 1 |
| Example EVOH 29 | 44 | D | 2 |
| Comparative EVOH 1 | 29 | — | 0 |
| Comparative EVOH 3 | 29 | A | 8 |
| Comparative EVOH 6 | 38 | — | 0 |

Example 6

Example EVOH 1-4, 6, 8, 10, 12, 22-25, and 27-29 and Comparative EVOH 1, 3, and 6 were assessed to determine certain properties, such as the melting pressure, the melting force, the fluorine content, the range of the micro-particle size, the dispersion of the micro-particles, and the melting point temperatures of the resin composition. Films of Example EVOH 1-4, 6, 8, 10, 12, 22-25, and 27-29 and Comparative EVOH 1, 3, and 6 were prepared in accordance with the procedures described in Examples 3.

The melting pressure and melting force were determined for each of Example EVOH 1-4, 6, 8, 10, 12, 22-25, and 27-29 and Comparative EVOH 1, 3, and 6. Specifically, samples from each of Example EVOH 1-4, 6, 8, 10, 12, 22-25, and 27-29 and Comparative EVOH 1, 3, and 6 were loaded into a RH7 Flowmaster Twin-bore Capillary Rheometer, which was produced by Malvern Instruments LTD. A long die (Hole ID:1 mm, Length: 20 mm) was installed on the test side and a zero die (Hole ID:1 mm, Length: 0.25 mm) was installed on the blank side of the RH7 Flowmaster Twin-bore Capillary Rheometer. The RH7 Flowmaster Twin-bore Capillary Rheometer had a bore size of 15 mm, an Ultra-MAX-HT pressure sensor (Model no.: UMHT3-6-M-X-18-D8-30M-B), and used Rosand Rheometer Control Software Ver. 8.6 as the software platform. The RH7 Flowmaster Twin-bore Capillary Rheometer can apply a max force of 50 kN.

The RH7 Flowmaster Twin-bore Capillary Rheometer was maintained at a temperature of 190° C. for 30 minutes prior to loading of the pellets. The pellets were squeezed at a moderate speed to allow the air between the materials to be discharged and melted in the twin bore of the RH7 Flowmaster Twin-bore Capillary Rheometer for 9 minutes before the testing started. The testing shear rate range was about 10 to about 10,000 (s$^{-1}$).

Table 10, provided below, compares the properties of Example EVOH 1-4, 6, 8, 10, 12, 22-25, and 27-29 and Comparative EVOH 1, 3, 6. The fluorine content, range of microparticle sizes, dispersion of microparticles, and melting point temperatures were determined in accordance with the procedures described in Examples 2-4.

TABLE 10

| | Fluorine Content (wt %) | Particle Size range (μm) | Dispersion | Melting pressure (at 190° C., 20 s$^{-1}$) | Melting force (at 190° C., 20 s$^{-1}$) | 1$^{st}$ Melting Point Temp. (C°) | 2$^{nd}$ Melting Point Temp. (C°) |
|---|---|---|---|---|---|---|---|
| Example EVOH 1 | 3.5~41 | 1.2~5 | ○ | 5.2 | 0.1 | 121 | 186.9 |
| Example EVOH 2 | 8~44 | 1.6~8 | ○ | 5.3 | 0.04 | 122 | 186.4 |
| Example EVOH 3 | 9~43 | 1.5~18 | ○ | 6.8 | 1.4 | 125.1 | 186.3 |
| Example EVOH 4 | 1.8~12 | 0.5~5 | ○ | 6.1 | 1.1 | 125.2 | 186.8 |
| Example EVOH 6 | 1.5~10.5 | 0.7~3 | ○ | 5.2 | 0.1 | 134.6 | 165.6 |
| Example EVOH 8 | 3.6~30.6 | 1.2~9 | ○ | 1.72 | 1.7 | 110 | 164.7 |
| Example EVOH 10 | 10~40.6 | 2.5~12 | ○ | 5.6 | 0.08 | 123.3 | 164.8 |
| Example EVOH 12 | 4.8~46.5 | 1.5~8 | ○ | 4.8 | 0.14 | 111 | 171.9 |
| Example EVOH 22 | 2.1~30 | 1.3~7 | ○ | 4.5 | 0.7 | 130 | 180.9 |
| Example EVOH 23 | 3.9~42.5 | 1.5~8 | ○ | 5 | 0.5 | 118.5 | 181 |
| Example EVOH 24 | 4.2~46.9 | 1.5~8 | ○ | 4.9 | 0.8 | 113.7 | 181.5 |
| Example EVOH 25 | 5~47.2 | 1.6~10 | ○ | 4.9 | 0.9 | 117 | 181.2 |
| Example EVOH 27 | 2~20 | 0.5~2 | ○ | 5.3 | 1.1 | 133.7 | 185.7 |
| Example EVOH 28 | 6~36 | 1.5~9 | ○ | 5 | 0.6 | 120.7 | 181 |
| Example EVOH 29 | 1.6~20 | 0.6~1.5 | ○ | 2.03 | 0.07 | 132.5 | 185.4 |
| Comparative EVOH 1 | 0 | NA | X | 7.6 | 2.42 | NA | 187 |
| Comparative EVOH 3 | 16~48.5 | 0.6~40 | X | 7.2 | 1.6 | 128 | 186.6 |
| Comparative EVOH 6 | 0 | NA | X | 7.2 | 1.8 | NA | 172.8 |

Example EVOH 1-4, 6, 8, 10, 12, 22-25, and 27-29 each exhibited excellent dispersion, while Comparative EVOH exhibited inferior dispersion. As discussed above, a "X" was given to the EVOH resin composition if one or more micro-particles had a particle size of larger than 20 μm or if no micro-particles were formed, and a "0" was given if excellent dispersion was exhibited without agglomeration.

Films were formed from Example EVOH 1-4, 6, 8, 10, 12, 22-25, and 27-29 and Comparative EVOH 1, 3, and 6 in accordance with methods similar to those described in the above Examples, such as Example 3. Additionally, the films were assessed to determine the appearance of such films, the precipitation at the die, the Charpy impact strength of the films, and the elongation breakage of the films using the procedures and the qualitative valuation metrics discussed above. A summary of the properties of the films of Example EVOH 1-4, 6, 8, 10, 12, 22-25, and 27-29 and Comparative EVOH 1, 3, and 6 is provided below in Table 11.

TABLE 11

| | Film Appearance | Die precipitation | Charpy impact Strength (KJ/m$^2$) | Elongation Breakage (%) |
|---|---|---|---|---|
| Film of Example EVOH 1 | ○ | ○ | 2.45 | 17.8 |
| Film of Example EVOH 2 | ○ | ○ | 3.19 | 19.9 |
| Film of Example EVOH 3 | ○ | ○ | 3.62 | 20.2 |
| Film of Example EVOH 4 | ○ | ○ | 2.52 | 17.8 |
| Film of Example EVOH 6 | ○ | ○ | 3.1 | 22.6 |
| Film of Example EVOH 8 | ○ | ○ | 5.45 | 23.9 |
| Film of Example EVOH 10 | ○ | ○ | 6.8 | 24.1 |
| Film of Example EVOH 12 | ○ | ○ | 2.3 | 20.5 |
| Film of Example EVOH 22 | ○ | ○ | 2.48 | 17.9 |
| Film of Example EVOH 23 | ○ | ○ | 2.68 | 18.2 |
| Film of Example EVOH 24 | ○ | ○ | 2.9 | 18.6 |
| Film of Example EVOH 25 | ○ | ○ | 3.2 | 19.2 |
| Film of Example EVOH 27 | ○ | ○ | 3.3 | 22.4 |
| Film of Example EVOH 28 | ○ | ○ | 2.9 | 18.4 |
| Film of Example EVOH 29 | ○ | ○ | 2.82 | 23.1 |
| Film of Comparative EVOH 1 | Δ | X | 2.25 | 17.1 |

TABLE 11-continued

| | Film Appearance | Die precipitation | Charpy impact Strength (KJ/m$^2$) | Elongation Breakage (%) |
|---|---|---|---|---|
| Film of Comparative EVOH 3 | X | ○ | 2.64 | 18.5 |
| Film of Comparative EVOH 6 | Δ | X | 2.1 | 19 |

It was surprisingly discovered that if the melting pressure of the EVOH resin composition of the instant disclosure was within the range of 1.7 to 7.0 MPa at a shear rate of 20 s$^{-1}$ and a temperature of 190° C., the films exhibited no precipitation at the die and had less than three fisheyes with a size greater than 200 μm was less than 3 within a square meter. As shown above, Example EVOH 1-4, 6, 8, 10, 12, 22-25, and 27-29 each exhibited no precipitation at the die and had less than three fisheyes with a size greater than 200 μm was less than 3 within a square meter. The Charpy impact strength for the films of Example EVOH 1-4, 6, 8, 10, 12, 22-25, and 27-29 were in the range of 2.3 to 6.8 KJ/m$^2$, while the elongation breakage for the films of Example EVOH 1-4, 6, 8, 10, 12, 22-25, and 27-29 were in the range of 17.8 to 23.9%.

Comparative EVOH 1 and 6, which exhibit a melting pressure out of the desired range had precipitation at die and poor flexibility. With the presence of fluoropolymer(s), the decrease of melting pressure represents a smoother flow behavior for the EVOH in the screw extruder, thereby reducing the precipitation at die and improving the film appearance due to the protection of fluoropolymer on the inner wall of screw extruder, as discussed above.

With regard to the fluoropolymer existing in the EVOH resin composition, if the fluorine content is too high, the EVOH resin composition may have an undesired melting pressure, which leads to a poor film appearance.

As used herein, all ranges provided are meant to include every specific range within, and combination of sub ranges between, the given ranges. Additionally, all ranges provided herein are inclusive of the end points of such ranges, unless stated otherwise. Thus, a range from 1-5, includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition comprising:
   an ethylene-vinyl alcohol copolymer, and
   one or more fluorine-containing particles, wherein the ethylene-vinyl alcohol copolymer resin composition has a melting pressure of 1.7 to 7.0 MPa at a shear rate of 20 s$^{-1}$ and a temperature of 190° C.

2. The ethylene-vinyl alcohol copolymer resin composition of claim 1, wherein the one or more fluorine-containing particles comprise a fluorinated polymer.

3. The ethylene-vinyl alcohol copolymer resin composition of claim 1 further comprising:
   at least two melting point temperatures, a first melting point temperature and a second melting point temperature.

4. The ethylene-vinyl alcohol copolymer resin composition of claim 3, wherein the first melting point temperature is from about 100° C. to about 140° C.

5. The ethylene-vinyl alcohol copolymer resin composition of claim 3, wherein the second melting point temperature is from about 150° C. to about 195° C.

6. The ethylene-vinyl alcohol copolymer resin composition of claim 1 having a melting pressure of 1.7 to 6.8 MPa at a shear rate of 20 s$^{-1}$ and a temperature of 190° C.

7. The ethylene-vinyl alcohol copolymer resin composition of claim 1 having a melting force of 0.04 to 2.4 kN at a shear rate of 20 s$^{-1}$ and a temperature of 190° C.

8. The ethylene-vinyl alcohol copolymer resin composition of claim 2, wherein the fluorine-containing particles each having a particle size with a diameter or a length of the major axis that is not greater than 20 μm.

9. The ethylene-vinyl alcohol copolymer resin composition of claim 2, wherein the fluorine-containing particles comprise about 1.5 to about 48 weight % of fluorine, based on the total weight of carbon, oxygen, and fluorine elements.

10. The ethylene-vinyl alcohol copolymer resin composition of claim 8, wherein the fluorine-containing particles each having a particle size with a diameter or a length of the major axis that is 0.5 to about 19 μm.

11. A film comprising the ethylene-vinyl alcohol of claim 1, wherein the film has a Charpy impact strength of at least 2.3 KJ/m$^2$ according to ISO 179-1 at 23° C. and an elongation at break of at least 17.8% according to ISO 527-2 at 23° C.

12. The film of claim 11, wherein the film has an elongation at break of at least 20%.

13. A multi-layer structure comprising:
   (a) at least one layer formed from the ethylene-vinyl alcohol copolymer resin of claim 1;
   (b) at least one polymer layer; and
   (c) at least one adhesive layer.

14. The multi-layer structure of claim 12, wherein the polymer layer is selected from the group consisting of a low density polyethylene layer, a polyethylene-graft-maleic-anhydride layer, a polypropylene layer, a nylon layer, and a combination thereof.

* * * * *